US011377071B2

(12) United States Patent
Wall et al.

(10) Patent No.: US 11,377,071 B2
(45) Date of Patent: Jul. 5, 2022

(54) METHODS FOR LOCKING AND/OR UNLOCKING ELECTRIC VEHICLE AND ASSOCIATED APPARATUS

(71) Applicant: Gogoro Inc., Hong Kong (CN)

(72) Inventors: Kenneth Edward Wall, Greer, SC (US); Ming-Hsiang Lai, New Taipei (TW); Chun-Sheng Hsu, Taoyuan (TW); Ching Chen, New Taipei (TW); Jia-Yang Wu, New Taipei (TW)

(73) Assignee: Gogoro Inc., Hong Kong (CN)

( * ) Notice: Subject to any disclaimer, the term of this patent is extended or adjusted under 35 U.S.C. 154(b) by 227 days.

(21) Appl. No.: 16/542,250

(22) Filed: Aug. 15, 2019

(65) Prior Publication Data

US 2020/0086829 A1 Mar. 19, 2020

Related U.S. Application Data

(60) Provisional application No. 62/732,984, filed on Sep. 18, 2018.

(51) Int. Cl.
  *G05B 19/00* (2006.01)
  *B60R 25/24* (2013.01)
  *H04W 4/021* (2018.01)
  *H04W 4/40* (2018.01)
  *H04W 4/02* (2018.01)
  (Continued)

(52) U.S. Cl.
  CPC .......... *B60R 25/245* (2013.01); *B60R 25/045* (2013.01); *B60R 25/104* (2013.01); *B60R 25/209* (2013.01); *B60R 25/22* (2013.01); *H04W 4/021* (2013.01); *H04W 4/023* (2013.01); *H04W 4/40* (2018.02);
  (Continued)

(58) Field of Classification Search
  CPC ................ B60R 25/04; G07C 9/00309; G07C 9/00658; G07C 2009/00547
  See application file for complete search history.

(56) References Cited

U.S. PATENT DOCUMENTS 4,873,530 A * 10/1989 Takeuchi ........... G07C 9/00309
                                                343/711
6,359,348 B1 * 3/2002 King ...................... B60R 25/24
                                                307/10.1
(Continued)

FOREIGN PATENT DOCUMENTS

CN      106530470 A     3/2017
DE      19826904 A1    12/1999
(Continued)

OTHER PUBLICATIONS

Official Notification received for co-pending Taiwanese Application No. TW108130315A, Applicant: Gogoro Inc., dated Dec. 10, 2020, 1 page.

(Continued)

*Primary Examiner* — Munear T Akki
(74) *Attorney, Agent, or Firm* — Perkins Cole LLP

(57) ABSTRACT

The present disclosure relates to apparatus and methods for locking and/or unlocking a vehicle based on a location of a mobile device associated with the vehicle. In one embodiment a processor in a vehicle analyzes a position of a mobile device relative to the vehicle and allows the vehicle to be unlocked when the mobile device is determined to be approaching the vehicle.

32 Claims, 12 Drawing Sheets

(51) Int. Cl.
  *B60R 25/20* (2013.01)
  *B60R 25/045* (2013.01)
  *B60R 25/104* (2013.01)
  *B60R 25/22* (2013.01)
  *B60R 25/10* (2013.01)

(52) U.S. Cl.
  CPC . *B60R 2025/1013* (2013.01); *B60R 2325/108* (2013.01); *B60R 2325/205* (2013.01)

(56) References Cited

U.S. PATENT DOCUMENTS

| | | | |
|---|---|---|---|
| 6,700,475 B1* | 3/2004 | Geber | G07C 9/00309 455/343.1 |
| 10,814,834 B2* | 10/2020 | Schlittenbauer | G07C 9/00309 |
| 2010/0075656 A1 | 3/2010 | Howarter et al. | |
| 2012/0059541 A1* | 3/2012 | Chiba | B60W 30/18027 701/22 |
| 2015/0105944 A1 | 4/2015 | Louboutin | |
| 2016/0176381 A1* | 6/2016 | Krawciw | B60R 25/24 340/5.72 |
| 2016/0225260 A1* | 8/2016 | Lin | G08G 1/096791 |
| 2016/0334853 A1* | 11/2016 | Ono | G06F 1/3265 |
| 2017/0297531 A1* | 10/2017 | Sakamoto | B60R 25/24 |
| 2018/0126951 A1 | 5/2018 | Ricci | |
| 2019/0299929 A1* | 10/2019 | Neuhoff | B60R 25/24 |
| 2020/0349781 A1* | 11/2020 | Warrier | H04B 17/318 |

FOREIGN PATENT DOCUMENTS

| | | |
|---|---|---|
| EP | 1669264 A1 | 6/2006 |
| JP | H05156851 A | 6/1993 |
| JP | 2004025938 A | 1/2004 |
| JP | 2007231654 A | 9/2007 |
| JP | 2013053587 A | 3/2013 |
| JP | 2014201968 A | 10/2014 |
| JP | 2016530747 A | 9/2016 |
| JP | 2017128884 A | 7/2017 |
| JP | 2017160761 A | 9/2017 |
| JP | 2018115463 A | 7/2018 |
| KR | 1020160024723 A | 3/2016 |
| KR | 101718072 B1 | 3/2017 |
| KR | 1020170034644 A | 3/2017 |
| TW | 200517288 A | 6/2005 |
| TW | 200615510 A | 5/2006 |
| TW | I561718 | 12/2016 |
| TW | M561877 | 6/2018 |
| WO | 2017182556 A1 | 10/2017 |
| WO | 2018108060 A1 | 6/2018 |

OTHER PUBLICATIONS

Korean Office Action received for co-pending Korean Patent Application No. KR10-2019-0105094; Applicant; Gogoro Inc.; dated Oct. 26, 2020, 14 pages.
Examination Report received for copending Indian Patent Application No. IN201914037466; Applicant; Gogoro Inc.; dated Nov. 25, 2020, 6 pages.
Taiwanese Office Action received for co-pending Taiwanese Application No. TW108130315, Applicant: Gogoro Inc., dated Mar. 22, 2021, 16 pages.
Japan Official Action received for Japanese Patent Application No. JP2019-153941; Applicant; Gogoro Inc.; dated Oct. 6, 2020, 8 pages.
Japanese Office Action issued for co-pending JP Application No. 2019-153941, Applicant: Gogoro Inc., dated Jun. 15, 2021, 4 pages.
Korean Office Action issued for co-pending KR Application No. 10-2019-0105094, Applicant: Gogoro Inc., dated Jul. 5, 2021, 4 pages.
Notice of Publication received for Taiwanese Application No. PHI-2019-000348; Applicant: Gogoro Inc., dated May 29, 2020, 2 pages.
European Search Report received for co-pending European Application No. EP19197675.2; Applicant: Gogoro Inc., dated Feb. 14, 2020, 4 pages.
Office Action issued for co-pending Taiwanese Application No. TW110134207, Applicant: Gogoro Inc., dated Jan. 19, 2022, 8 pages.

* cited by examiner

METHODS FOR LOCKING AND/OR UNLOCKING ELECTRIC VEHICLE AND ASSOCIATED APPARATUS

CROSS-REFERENCES TO RELATED APPLICATIONS

This application claims the benefit of U.S. Provisional Patent Application Ser. No. 62/732,984, filed on Sep. 18, 2018, and entitled "SYSTEMS FOR LOCKING AND/OR UNLOCKING ELECTRIC VEHICLE AND ASSOCIATED METHODS," the disclosure of which is hereby incorporated herein in its entirety by reference.

TECHNICAL FIELD

The present technology is directed to systems and methods for locking and/or unlocking a vehicle. More particularly, the present technology is directed to systems and methods for locking and/or unlocking an electric vehicle based on the location of a movable object or a mobile device carried by a user.

BACKGROUND

Vehicle locking systems are used to prevent unauthorized users from accessing, operating, or stealing vehicles. Traditionally, users can lock or unlock vehicles by physical keys. However, under certain circumstances, it is not convenient for users to lock/unlock their vehicle by traditional keys. For example, a user's hands can be full and therefore cannot hold/handle/operate a traditional key. Therefore, it is advantageous to have an improved system to address this issue.

BRIEF DESCRIPTION OF THE DRAWINGS

Embodiments of the disclosed technology will be described and explained through the use of the accompanying drawings.

Figure 1A:
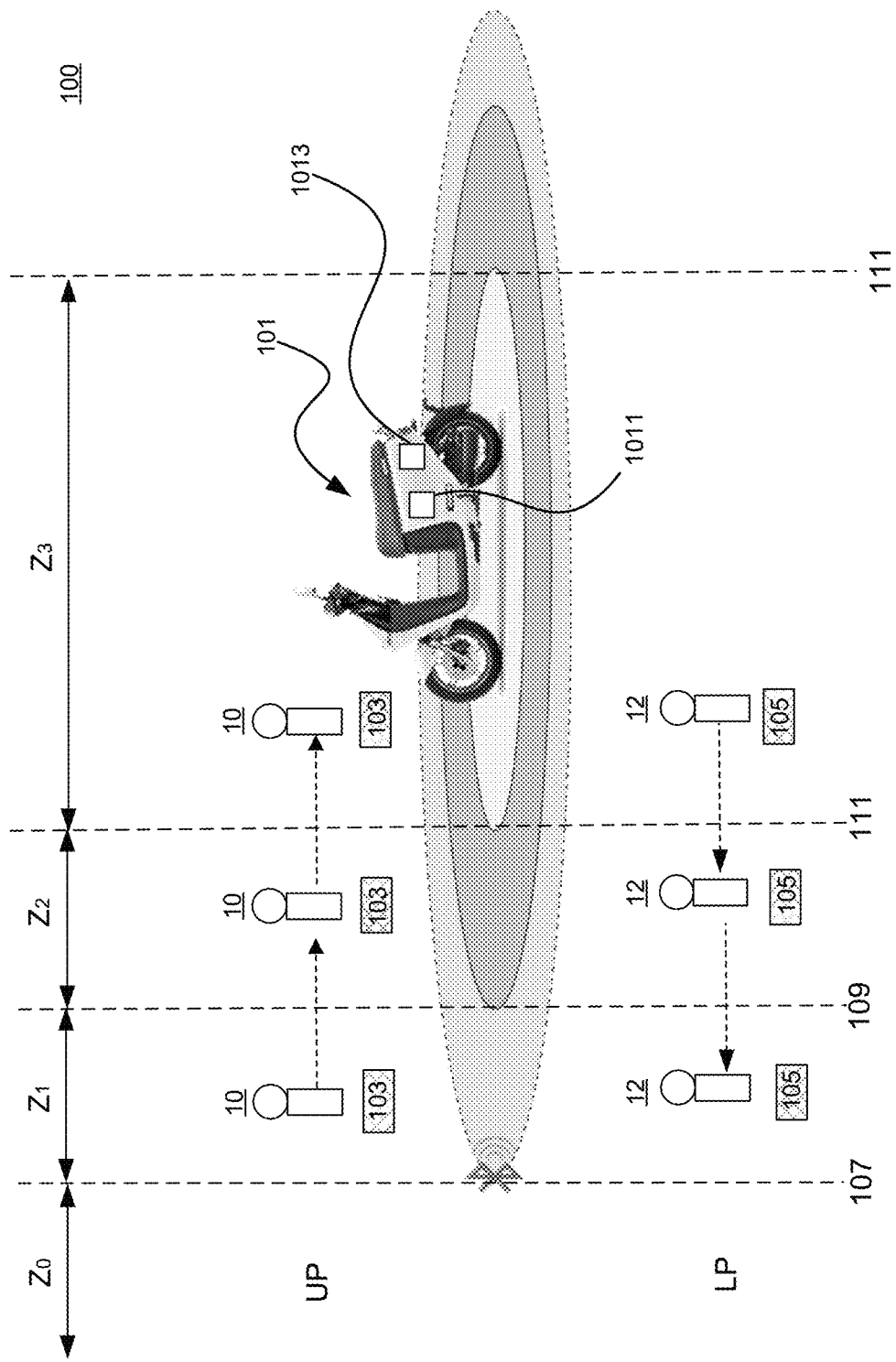
FIG. 1A is a schematic diagram illustrating a system in accordance with embodiments of the disclosed technology.

The drawings are not necessarily drawn to scale. For example, the dimensions of some of the elements in the figures may be expanded or reduced to help improve the understanding of various embodiments. Similarly, some components and/or operations may be separated into different blocks or combined into a single block for the purposes of discussion of some of the embodiments. Moreover, although specific embodiments have been shown by way of example in the drawings and described in detail below, one skilled in the art will recognize that modifications, equivalents, and alternatives will fall within the scope of the appended claims.

DETAILED DESCRIPTION

In this description, references to "some embodiments," "one embodiment," or the like, mean that the particular feature, function, structure or characteristic being described is included in at least one embodiment of the disclosed technology. Occurrences of such phrases in this specification do not necessarily all refer to the same embodiment. On the other hand, the embodiments referred to are not necessarily mutually exclusive.

The present disclosure relates to vehicles and methods for enabling a user to unlock or lock a vehicle (e.g., two-wheeled, three-wheeled, four-wheeled, etc.) without using a traditional key. When the user approaches the vehicle, the disclosed system communicates with (or detects signals from) a mobile device carried by the user and then determines whether to unlock the vehicle. In some embodiments, the disclosed system receives information regarding the user's locations and/or moving trajectories (e.g., from communicating with the mobile device) and then determines whether to unlock or lock the vehicle. For example, the system can unlock the vehicle for the user if it determines that the user approaches the vehicle and intends to start operating the vehicle. For example, from the user's locations (e.g., within a predetermined distance from the vehicle) and/or moving trajectories, the system can learn that the user approaches the vehicle or even sits on (or stands on the side of) the vehicle for a predetermined time period (e.g., 2-10 seconds), which suggests that the user may want to start operating the vehicle. As another example, if the system determines that the user is leaving the vehicle (e.g., moving away from the vehicle, crossing a boundary line, etc.), the system can then lock the vehicle.

The disclosed system unlocks the vehicle by turning on the power of the vehicle (e.g., provided by a battery), which enables the user to start an engine or a motor (or a combination thereof) of the vehicle. In some embodiments, when a vehicle is unlocked, a user can press a physical or virtual button (e.g., a "GO" or "START" button positioned/disposed adjacent to or integrally formed/disposed with a dashboard of the vehicle; or a "GO" button shown on a dashboard of the vehicle or a display of the user's mobile device) to start the engine of the vehicle. In some embodiments, to start the engine, the system can further ask a user to perform a specific action (e.g., to hold a brake lever, to position a handle bar at a certain angle, etc.) together with pressing the button.

One aspect of the present technology includes providing a vehicle security system that automatically locks a vehicle based on a user's location or moving trajectories. For example, when the user moves away from the vehicle, the disclosed system can communicate with (or detect signals from) a mobile device carried by the user and then determines whether to lock the vehicle. From the user's locations and/or moving trajectories, the system can learn that the user has left the vehicle, which suggests that the user may want to lock the vehicle. In such embodiments, the system can lock the vehicle for the user if it determines that the user has left the vehicle. In other embodiments, the system can lock the vehicle if the system determines that the user intends to leave the vehicle for an extended time period (e.g., more than 5 minutes).

The disclosed system can lock the vehicle by turning off the power of the vehicle (e.g., power provided by a battery to the engine/motor and/or other major systems, such as steering/braking/lighting systems, of the vehicle), which prevents the user from starting an engine of the vehicle (via a component powered by the battery, such as a user interface shown on a display) or otherwise operating the vehicle motor. Once a vehicle is locked, if a user wants to operate (e.g., drive or ride) the vehicle, the user needs to be authenticated (e.g., an authentication made between the disclosed system and the mobile device wirelessly, or an authenticated signal received by the system via a wireless module such as a Bluetooth module, a near field communication (NFC) reader, or the like) so as to turn on the power of the vehicle (e.g., provide electrical power to a major/main systems of the vehicle) and the engine of the vehicle. In some embodiments, the disclosed system can automatically lock the vehicle when it determines that the user is away from the vehicle (e.g., the distance between a mobile device carried by the user and the vehicle is greater than an "Auto-lock" distance threshold). For example, when the system determines that the user is away (e.g., out of a certain zone or area) for a specific time (e.g., 3-10 seconds), the system can automatically lock the vehicle. In some embodiments, the system can determine that the user is away based on analyzing signal strength, communication quality, and/or other suitable characteristics such as a GPS coordinates sent from the mobile device.

In some embodiments, the disclosed technology enables a user to set up multiple zones and accordingly the system can perform auto-locking and auto-unlocking based on these zones. In some embodiments, the zones can be determined/configured based on distances from a vehicle, signal strength/characteristics from a mobile device carried by a user, environmental factors (e.g., the vehicle is parked in an outdoor parking lot or in a building), user preferences, etc.

Another aspect of the present technology includes providing a system that can effectively manage various states of a vehicle. These states include a "locked" state (e.g., battery power of the vehicle is turned off), a "Proximity-Auto-On" or "Proximity-Auto-Off" state (e.g., a proximity module/component/process is activated to enable auto-unlocking or auto-locking based on users' locations or moving trajectories), an "unlocked" state (e.g., the battery power of the vehicle is on but an engine of the vehicle remains off), and a "ready-to-operate" state (e.g., both the battery power and the engine of the vehicle are turned on). The disclosed system enables users to customize the ways they can interact with the vehicle and desired security levels in these different states. Embodiments of these states are discussed in detail below with reference to FIGS. 3A and 3B.

When a vehicle is in the "locked" state, the vehicle's battery power is turned off (e.g., a dashboard of the vehicle is off) and the engine or motor of the vehicle is also turned off. In some embodiments, one or more locks (such as a handle lock, wheel lock, or transmission system lock) are used to restrain movements of the vehicle. At this stage, a distance measurement device of the vehicle (e.g., a Bluetooth communication device/module, GPS module, telecommunication module, or components with similar functions) can still be active to monitor/search signals from a user's mobile device or the like. For example, vehicles in the locked state are often parked and are not in operation.

When the distance measurement device of a vehicle detects that a signal indicating that an authorized mobile device (e.g., a mobile device that is associated with the vehicle through a user account) is in range (e.g., close to the vehicle), the distance measurement device notifies the system to activate a "Proximity-Auto-On" function, and then the vehicle enters the "Proximity-Auto-On" state. To signify the entry of this state, the system can turn on an indicative light. For example, an "iQ" light on a dashboard of the vehicle and a notification on the mobile device can show that a Bluetooth connection has been established. In some embodiments, the indicative light can be an existing light of the vehicle such as a directional light, a head light, a cornering light, etc. In such embodiments, the indicative light can blink one or more times (e.g., twice) to signify the entry of the "Proximity-Auto-On" state. The indicative light can be powered by a separate battery (as compared to a main battery of the vehicle, which is used to power majority parts of the vehicle). In some embodiments, sounds from the vehicle can also be used to signify the entry of the "Proximity-Auto-On" state together with the indicative light. In some embodiments, the sounds from the vehicle alone can be used to signify the entry the "Proximity-Auto-On" state.

When a vehicle is in the "Proximity-Auto-On" state, the vehicle's battery power (e.g., the main battery mentioned above) and engine remain off. At this stage, the system keeps monitoring the locations of the detected user mobile device. Once certain criterion/criteria is/are met (e.g., the mobile device is close enough), the system can then unlock (or lock) the vehicle by turning on (or off) the vehicle power (e.g., provided by the main battery mentioned above). In some embodiments, at this stage, the system still allows a user to operate the vehicle in predetermined ways, such as opening a trunk lid of the vehicle (e.g., by pressing a button of a vehicle). In some embodiments, the system can perform certain actions (e.g., automatically open the trunk lid of the vehicle) in this state. In some embodiments, the trunk lid is a lid or cover configured to cover or secure a trunk or a storage compartment of the vehicle. In some embodiments, the trunk lid can be operably (e.g., rotatably) coupled to the trunk such that the trunk lid can be operated so as to open or close the trunk. In some embodiments, the trunk can be used to store helmets, gloves or other gears for operating the vehicle. Therefore, this arrangement of automatically opening the truck lid provides an easier way (e.g., without additional operations such as turning a key or pressing a button) for users to access the helmets (or other items stored in the trunk) before riding the vehicle.

In some embodiments, when the vehicle is switched to the "Proximity-Auto-On" state, power supply from the main battery of the vehicle is turned on (e.g., by sending, from a processor of the vehicle, a wake-up signal to the battery or a power management unit coupled to the battery). In some embodiments, the power supply from the main battery can be limited to certain components only, such as indicative lights (e.g., for blinking). In this case, the user of the vehicle does not have access to all functions of the vehicle.

Once the vehicle power is turned on, the vehicle moves to the "unlocked" state (e.g., battery power on). At this stage, the system turns on a dashboard of the vehicle with that the user can control the vehicle via a user interface thereon. Once certain criterion/criteria is/are met (e.g., pass a user authentication, a user action of operating a vehicle component in a predetermined way such as holding a brake lever and pressing a start button, etc.), the system then allows the user to turn on the engine/motor of the vehicle and the vehicle enters the "ready-to-operate" state, in which the user can drive or ride the vehicle.

When a user stops a vehicle and then turns off the engine/motor, an auto-locking process is activated. The vehicle then moves from the "ready-to-operate" state to the "unlocked" state. In some embodiments, the system can move the vehicle to the "unlocked" state after the engine/motor is turned off. In some embodiments, when the system detects that the user's mobile devices moves away from the vehicle, the system can move the vehicle to the "locked" state. More particularly, at the "unlocked" stage, the system keeps monitoring the locations of the detected user mobile device. Once the system determines that the user's mobile device is out of range, the system can then lock the vehicle (e.g., turn it into the "locked" state).

In some embodiments, the system can use distance thresholds or zones to determine the state of a vehicle. For example, the system can have a "far distance" threshold (e.g., an outer boundary) and a "near distance" threshold (e.g., an inner boundary). When the system determines that a user's mobile device is in a zone within the "near distance" threshold, the system can set the vehicle in the "Proximity-Auto-On" state. When the system determines that the user's mobile device is within the "near distance" threshold from the vehicle, the system can set the vehicle in the "unlocked" state. Similarly, when the system determines that the user's mobile device is away from the vehicle beyond the "far distance" threshold, the system can set the vehicle in the "locked" state. In some embodiments, the system can use thresholds based on other characteristics, such as signal strength, etc.

In some embodiments, the "far distance" and "near distance" thresholds are different distance thresholds. Advantages of having two different thresholds include that it can effectively determine user's intentions regarding whether to lock or unlock the vehicle. For example, when the user moves out of the far distance threshold (e.g., "far" enough from the vehicle), the system can more precisely determine that the user intends to leave the vehicle so that the system can lock the vehicle. Similarly, when the user moves inside the near distance threshold (e.g., "close" enough to the vehicle), the system can more precisely determine that the user intends to operate the vehicle so that the system can unlock the vehicle. In some embodiments, to further enhance the accuracy of the determination, the present system can use moving trajectories of the user to support the determination. In some embodiments, under practical use or user's preference, the "far distance" and "near distance" thresholds can be set close to (or even overlap) each other. Such embodiments, however, do not contradict to the idea of having two different thresholds for locking and unlocking the vehicle in the present technology.

In some embodiments, when a vehicle is in the "Proximity-Auto-On" state, the system can provide a certain period of time for a user to take an action to move the vehicle to the "unlocked" state. For example, after the vehicle enters the "Proximity-Auto-On" state, the system can provide a time period (e.g., a 5-minute window) for a user to press a "GO" button shown on the user's mobile device to confirm setting the vehicle to the "unlocked" state (e.g., turn on its main battery power). In some embodiments, if the user fails to confirm or respond within the time period, the system can return the vehicle back to the "locked" state. If the system later (e.g., 1 minute after the vehicle is locked) detects that the mobile device again moves toward the vehicle, it can again set the vehicle in the "Proximity-Auto-On" state. In some embodiments, the vehicle can send a notification to the user (e.g., sending wireless signals to the mobile device and the notification can be displayed by an app or a notification mechanism (e.g., a light, a speaker, etc.) in the mobile device) regarding the state change (e.g., the vehicle has been moved from the "Proximity-Auto-On" state to the "locked" state). In some embodiments, after turning the vehicle state from the "Proximity-Auto-On" state to the "locked" state, the system can again check the location of the mobile device (e.g., after 35 seconds). If the mobile device appears to remain close to the vehicle, the system will allow the user to open a trunk of the vehicle by pressing a function key of the vehicle (e.g., a key or button positioned/disposed adjacent to a handle bar of the vehicle) in case that the user has accidentally left the mobile device in the trunk.

In some embodiments, however, when a vehicle is in the "unlocked" state, for security purposes, the system does not provide such a time window before the system moves the vehicle to the "locked" state. In some embodiments, when a vehicle is in the "unlocked" state, the system only provides a short time window (e.g., 1-5 seconds) before the system moves the vehicle to the "locked" state. In some embodiments, the "unlocked" state can be called as a "Proximity-Auto-Off" state, which means that when the vehicle is in the "unlock" state and the system determines that the mobile device is away from the "far distance" threshold, the system can move the vehicle in the "locked" state.

In some embodiments, the signals received from user's mobile devices can include Bluetooth signals, and/or other suitable wireless communication signals. In some embodiments, the system analyzes the strength or characteristics of the received signals (or information related to strength or characteristics of the connection between the user's mobile device and the system, such as received signal strength indicator (RSSI) information in a Bluetooth signal, or estimated/calculated round trip time of signals), or information encoded (e.g., GPS location information) in the signals and then determines the locations and/or moving trajectories of the user's mobile devices. In some embodiments, the user's mobile device includes a smartphone, a wearable device, a keyless controller, or other suitable devices.

In some embodiments, the system can use one or more filters to process the signals or information received from user's mobile device. For example, the system can use a low-pass filter, a high-pass filter, a mean filter, a Kalman or Linear Quadratic Estimation (LQE) filter, and a combination of the foregoing, to screen out unreliable signals (e.g., noise). In some embodiments, information corresponding to distance could be directly derived (e.g., from distance information provided by Bluetooth 5.0 communication protocol). In some embodiments, the information of RSSI in a Bluetooth connection between the user's mobile device and the system may be used to determine the signal strength. The system/vehicle may continuously receive RSSI information when the vehicle is in the "Proximity-Auto-On" state or "Proximity-Auto-Off" state. Since the RSSI information is strongly affected by the environmental conditions (e.g., weather, moving condition, obstacles in-between), the above-mentioned filters can be used to smoothing the curves of RSSI variation, so as to reduce the interference/effect from the environments. For example, a BLE (Bluetooth Low Energy) module of the vehicle can perform filtering (e.g., a low pass filtering). After the BLE module collects 10 or 20 (or sets) RSSI values, the BLE module can pack the filtered RSSI values into a packet and send it to a (main) processor of the vehicle (i.e., a processor that handles the tasks for the above-mentioned system). When the main processor of the vehicle receives the packet of the filtered RSSI values, the main processor can (1) unpack the packet, (2) order the RSSI values according to a time sequence, (3) do another filtering (e.g., Kalman filtering) to the magnitude of the RSSI values, and (4) make the determination based on the double-filtered RSSI values.

In some embodiments, the vehicle/system can use information measured by a sensor (e.g., a gyro sensor, an accelerometer, a GPS sensor, etc.) of the mobile device to estimate the position/location/movement of the user device. For example, information measured by a gyro sensor and/or an accelerometer can be used to determine a moving direction of the mobile device. Also, information from the above-mentioned sensor(s) of the mobile device can also help the system to verify whether the mobile device is moving or not. Since the signal strength of the connection between the mobile device and the system/vehicle may be strongly affected by the environmental conditions, if the system detects a variation on signal strength while the information from the sensors of the mobile device indicates that the mobile device (and also the user) is still, then the system can determine that the user is not moving toward/away from the vehicle and the variation on signal strength can be considered as noise. In some embodiments, information measured by a GPS sensor can be used to determine the location of the mobile device and the vehicle (e.g., the location of the vehicle can be tracked and stored when it was operated). For example, the location of a vehicle can be stored in a server, a memory/storage component of the vehicle, and/or a mobile device.

In addition to the information from the sensor(s) of the mobile device, in some embodiments, the vehicle/system can also use other information to support its detection/determination on signal strength and/or distance (e.g., to improve accuracy). For example, the vehicle may include radar(s), Lidar(s), or a panoramic camera (or a plurality of cameras that can be combined to have a panoramic effect) that can collect additional information (e.g., distance information from the radar/Lidars, or object detection/tracking based on still/motion images generated by the camera) as supplemental information to support the system's detection/determination on variation of signal strength.

In some other embodiments, the vehicle can include more than one wireless transceivers, e.g., two Bluetooth or Bluetooth Low Energy (BLE) transceivers disposed at a front part of the vehicle and a rear side of the vehicle, respectively. Each of these transceivers can be wirelessly connected to the user's mobile device respectively, so the system can receive information/signals regarding signal strength/distance simultaneously from the transceivers. As a result, the characteristics analyzed from the transceivers can be compared and further analyzed, the accuracy of the determination on signal strength and/or distance can be improved, and the actual trajectories of the user's mobile device can be identified more clearly.

In some embodiments, the present technology can be implemented as a supplemental security mechanism in addition to a traditional authentication system (e.g., using physical keys or wireless key fobs) on the vehicle. In some embodiments, the present technology can be implemented as a stand-alone system that can be installed in a vehicle. In some embodiments, the present technology can be implemented as a part of a vehicle control system.

Figure 3A:
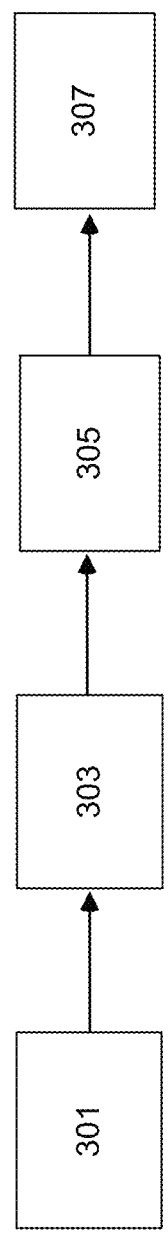
FIG. 3A is a schematic diagram illustrating various states of a vehicle during an auto-unlocking process in accordance with embodiments of the disclosed technology.
Figure 3B:
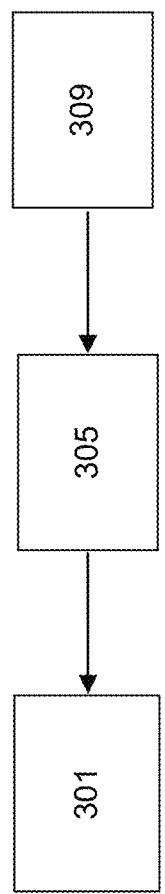
FIG. 3B is a schematic diagram illustrating various states of a vehicle during an auto-unlocking process in accordance with embodiments of the disclosed technology.

FIG. 1A is a schematic diagram illustrating a system 100 in accordance with embodiments of the disclosed technology. As shown, the system 100 includes a vehicle 101 and a mobile device 103 carried by user 10 or a mobile device 105 carried by user 12. In some embodiments, the vehicle 101 can include an electric vehicle, an electric scooter, a hybrid vehicle, or other suitable vehicles (e.g., vehicles having multiple states of power supply as shown in FIG. 3A or 3B, or vehicles that can be powered by one or more batteries or other power storage devices, such as capacitors, cells, etc.). In some embodiments, the mobile device 103 or 105 can include a smartphone, a tablet, a notebook, a wearable device, a portable controller, and/or other suitable devices. The vehicle 101 includes a processor 1013 and a distance measurement device 1011 (e.g., a wireless module such as a Bluetooth communication device/module or components with similar functions) configured to constantly monitor/search signals associated with the locations of the mobile device 103 or 105 (e.g., from the mobile device 103 or 105). In some embodiments, the vehicle 101 can include one or more input/out (I/O) component configured to receive or present information associated with the vehicle 101. In some embodiments, the I/O component can include a touch screen, a physical button, a virtual button on a display, a keypad, a lever (e.g., a brake lever), or other suitable components equipped on the vehicle.

In some embodiments, a method for controlling the vehicle 101 in accordance with the present technology can include, for example, (1) receiving a wireless signal from the mobile device 103 or 105; and (2) analyzing at least one characteristic of the wireless signal to determine a current location of the mobile device 103 or 105. The method can further include unlocking the vehicle 101 in response to a determination, based on the current location, that the mobile device 103 or 105 is within an inner boundary 111 adjacent to the vehicle 101, and that a first signal is received from a first input/output (I/O) component (e.g., a "GO" button, a "Start" button, and/or a brake lever) of the vehicle 101. In some embodiments, the method can further include locking the vehicle 101 in response to a determination, based on the current location, that the mobile device 103 or 105 is external to an outer boundary 109 external to the inner boundary.

As shown in FIG. 1A, the system can define four zones ($Z_0$, $Z_1$, $Z_2$, and $Z_3$) by a signal boundary 107, the outer boundary (or far threshold) 109, and the inner boundary (or close threshold) 111. In the illustrated embodiments, the signal boundary 107, the outer boundary 109, and the inner boundary 111 are concentric circles, and the center of these concentric circles is the vehicle 101. In other embodiments, however, the signal boundary 107, the outer boundary 109, and the inner boundary 111 can have different shapes (e.g., embodiments to be discussed with reference to FIGS. 2B and 2C). In some embodiments, the inner boundary 111 and the outer boundary 109 can be determined or customized based on various factors such as, types of vehicles, types of communication components used by the vehicle 101 and the mobile device 103 or 105, a user configuration (e.g., a user can determine these boundaries based on the user's habits or the ways of operating the vehicle 101 via the dashboard of the vehicle 101 or the mobile device 103 or 105), etc.

As shown in FIG. 1A, Zone $Z_0$ is defined as an area outside the signal boundary 107. The signal boundary 107 is determined based on whether the vehicle 101 can properly receive a signal from the mobile device 103 or 105 and establish a wireless connection thereby. When the mobile device 103 or 105 is within the signal boundary 107, the vehicle 101 can receive signals therefrom. When the mobile device 103 or 105 is not within the signal boundary 107, the vehicle 101 cannot properly receive a wireless signal from the mobile device 103 or 105. In other words, in some embodiments, the signal boundary 107 can be an outer limit of the outer boundary 109. In some embodiments, in addition to the distance requirement (e.g., within the signal boundary 107), the wireless connection can require an authentication process between the vehicle 101 and the mobile device 103 or 105 when establishing the wireless connection. Zone $Z_1$ is defined as an area between the signal boundary 107 and the outer boundary 109. Zone $Z_2$ is defined as an area between the outer boundary 109 and the inner boundary 111. Zone $Z_3$ is defined as an area within the inner boundary 101. In some embodiments, the mobile device 103 or 105 can include an active wireless communication component (e.g., a Bluetooth component) configured to emitting signals so that the vehicle 101 can determine the location of the mobile device 103 or 105 by receiving the signals or analyzing the signals. In some embodiments, the active wireless communication component can be controlled by an application (e.g., an app for controlling, operating, and/or communicating with the vehicle 101) installed in the mobile device 103 or 105. For example, when the application is initiated, the application can instruct the active wireless communication component to measure the location of the mobile device 103 or 105. In some embodiments, the active wireless communication component of the mobile device 103 or 105 can be an emitter that sends location signals (e.g., GPS signals) to the vehicle 101.

Figure 1B:
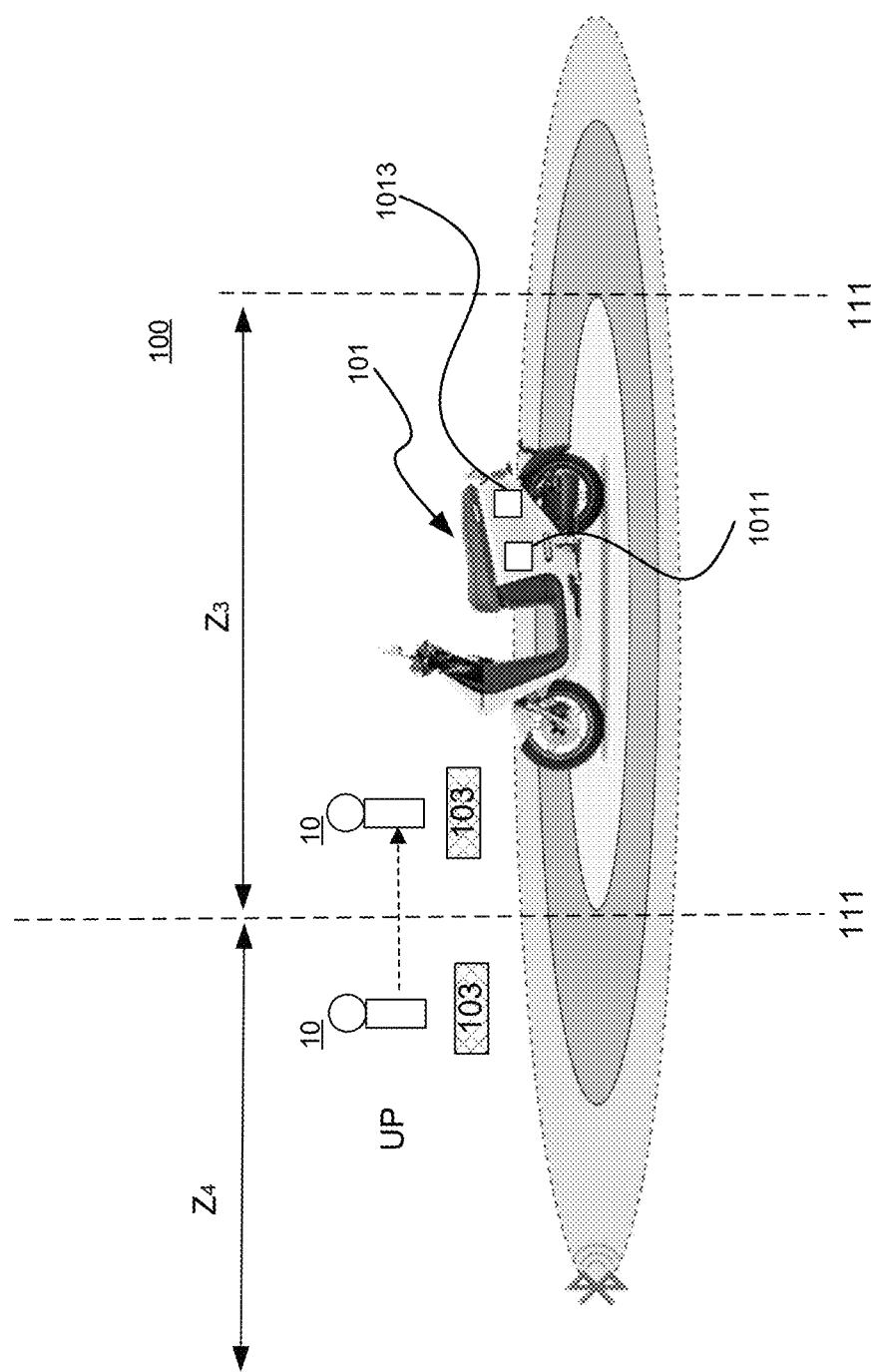
FIG. 1B is a schematic diagram illustrating an unlocking process of a vehicle in accordance with embodiments of the disclosed technology.
Figure 1C:
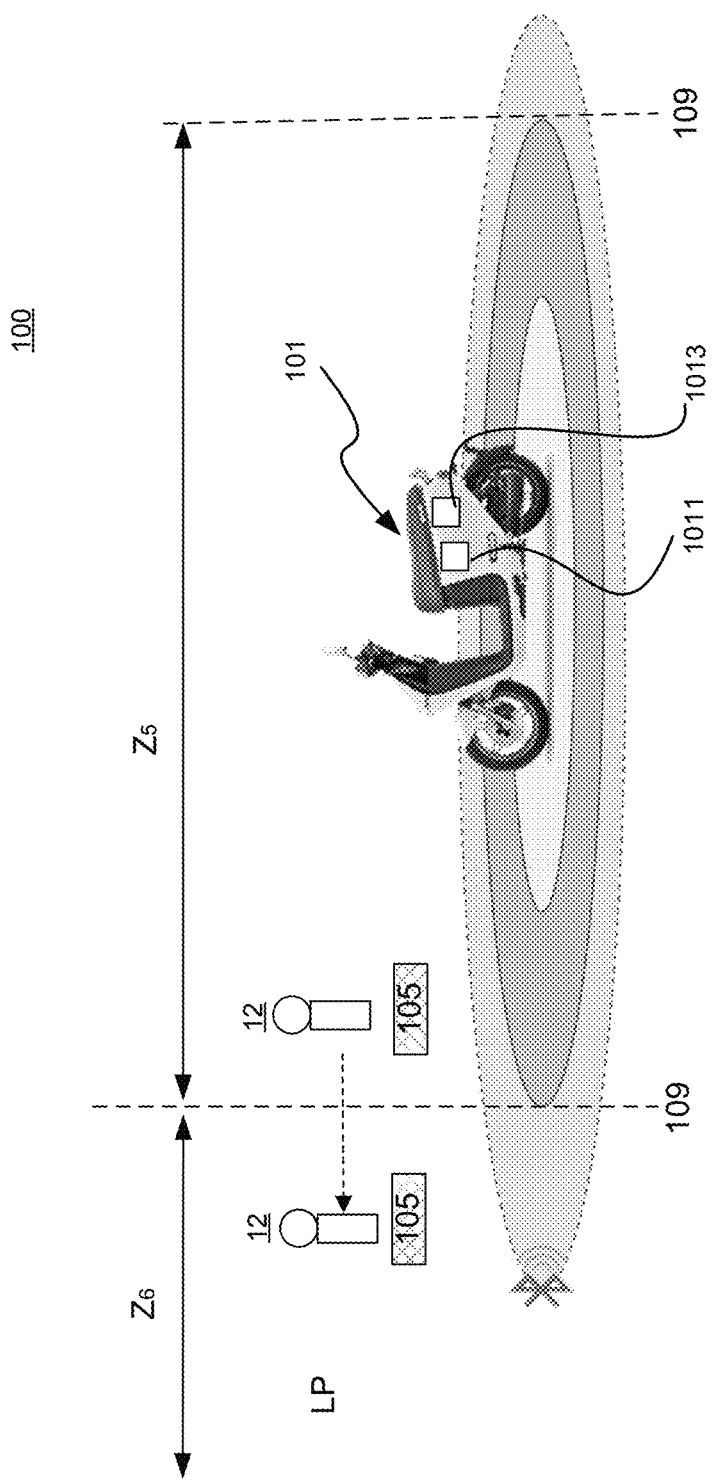
FIG. 1C is a schematic diagram illustrating a locking process of a vehicle in accordance with embodiments of the disclosed technology.

The system 100 can lock or unlock the vehicle 101 during an unlocking process UP (FIG. 1B) or a locking process LP (FIG. 1C). During the unlocking process, as shown in FIGS. 1A and 1B, the mobile device 103 carried by user 10 moves toward the vehicle 101 from Zone $Z_0$ to Zone $Z_3$. In Zone $Z_0$, the mobile device 103 is not connected to the vehicle 101.

In some embodiments, when the mobile device 103 enters Zone $Z_1$ from Zone $Z_0$, the system 100 can start to establish a communication between the mobile device 103 and the vehicle 101 (e.g., the vehicle 101 periodically receives wireless signals from the mobile device 103 and checks in with the mobile device 103 to see if it is still in Zone $Z_1$). When the mobile device 103 enters Zone $Z_2$ from Zone $Z_1$, the distance measurement device 1011 starts/keeps monitoring the locations of the mobile device 103 when it is in Zone $Z_2$ (e.g., the system 100 checks in with the mobile device 103 frequently to see if it is still in Zone $Z_2$). When the processor 1013 of the vehicle 101 detects that the mobile device 103 enters Zone $Z_3$ from Zone $Z_2$ through the monitoring from the distance measurement device 1011, the processor 1013 can activate a "Proximity-Auto-On" function of the vehicle 101. In some embodiments, in response to the entry of Zone $Z_3$, the system 101 can generate an indication of that entry (e.g., a blink of light, a sound, etc.).

In some embodiments, the "Proximity-Auto-On" function can be performed by the processor 1013 (e.g., an engine or electric control unit, ECU) of the vehicle 101. In some embodiments, the "Proximity-Auto-On" function can be performed by a separate device (or a circuit, control logic, etc.) coupled to the processor 1013. The "Proximity-Auto-On" function is designed to automatically unlock the vehicle 101 (e.g., turn on its power provided by a battery) based on the locations/trajectories of the mobile device 103. After the "Proximity-Auto-On" function is activated, the distance measurement device 1011 keeps monitoring the location of the mobile device 103.

When the "Proximity-Auto-On" function is activated, the vehicle's battery power (e.g., the main battery mentioned above) and engine remain off. At this stage, the distance measurement device 1011 keeps monitoring the locations of the mobile device 103. In some embodiments, the distance measurement device 1011 can transmit the location information of the mobile device 103 and then the processor 1013 can detect that the mobile device 103 enters Zone $Z_3$. In some embodiments, the distance measurement device 1011 can detect that the mobile device 103 enters Zone $Z_3$, and notifies the processor 1013 of the vehicle 101. The processor 1013 of the vehicle 101 then "unlock" the vehicle by turning on the vehicle power (e.g., provided by a battery). Once the vehicle power is turned on, a dashboard of the vehicle 101 is turned on such that user 10 can control the vehicle 101 via a user interface shown on the dashboard. The user 10 can then turn on an engine/motor of the vehicle 101 to operate the same. In some embodiments, when the processor 1013 determines that the mobile device 103 has entered Zone $Z_3$, the processor 1013 can unlock the vehicle 101 if the processor 1013 receives one or more signals from input/output (I/O) components of the vehicle. In some embodiments, the signals are generated in response to user operations such as pressing a "GO" button or a "START" button, holding a brake lever, a combination thereof, and/or other suitable operations.

In the embodiments where two or more signals are to be received, the user 10 can setup an order for receiving these signals. For example, the user 10 can decide using two signals (first and second signals) as "confirmation" for starting the engine. The first signal can be responsive to pressing a button (e.g., a "GO" button or a "Start" button), and the second signal can be responsive to pulling or holding a brake lever. In some embodiments, the first and second signal can both be responsive to pressing the button or pulling or holding the brake lever.

In some embodiments, when the mobile device 103 enters Zone $Z_1$ from Zone $Z_0$, the distance measurement device 1011 can provide information (e.g., signal strength or location information) of the mobile device 103 such that the processor 1013 can detect the entry and accordingly generate an audible or visual confirmation of the entry (e.g., a blink of light, a sound, etc.). In such embodiments, the distance measurement device 1011 keeps monitoring the locations of the when it is in Zone $Z_1$. When the processor 1013 detects that the mobile device 103 enters Zone $Z_2$, it can notify the system 100 to activate a "Proximity-Auto-On" function. After the "Proximity-Auto-On" function is activated, the distance measurement device 1011 keeps monitoring the location of the mobile device 103 (in both Zone $Z_2$ and $Z_3$). When the "Proximity-Auto-On" function is activated, the vehicle's battery power (e.g., the main battery mentioned above) and engine remain off. At this stage, the distance measurement device 1011 keeps monitoring the locations of the mobile device 103. When the processor 1013 detects that the mobile device 103 enters Zone $Z_3$, it notifies the process of the vehicle 101. The processor 1013 of the vehicle 101 can then "unlock" the vehicle by turning on the vehicle power (e.g., provided by a battery or other power source(s) on the vehicle). Once the vehicle power is turned on, a dashboard of the vehicle 101 is turned on such that the user 10 can control the vehicle 101 via a user interface shown on the dashboard. The user 10 can then turn on an engine of the vehicle 101 to operate the same.

FIG. 1B illustrates an unlocking process (UP) in accordance with embodiments of the disclosed technology. In FIG. 1B, Zones $Z_0$-$Z_2$ in FIG. 1A can be combined and together named as Zone $Z_4$. As shown in FIG. 1B, in some embodiments, when the mobile device 103 moves across the inner boundary 111 toward the vehicle 101 (i.e. moves from Zone $Z_4$ to Zone $Z_3$), the "Proximity-Auto-On" function is activated. When the "Proximity-Auto-On" function is activated, the vehicle's battery power (e.g., the main battery mentioned above) and engine remain off. In some embodiments, a button (e.g., a physical button, a visual button, a "GO" button, etc.) of the vehicle can be activated or powered by a battery of the vehicle. In some embodiments, the user 10 can then press the button to "power on" the vehicle (e.g., provide electricity power to multiple components of the vehicle, such as monitor, display, radio, etc.). At this "power-on" state (or "unlock" state), the engine remains off. In some embodiments, the user 10 can then press the button again to start the engine. In some embodiments, the user 10 can first hold a brake lever of the vehicle (or press another button, in other embodiments) and then press the button to start the engine. In some embodiments, the user 10 can hold a brake lever of the vehicle 101 and press the button at the same time to start the engine. In some embodiments, the user 10 can customize the way to start the engine (e.g., pull the brake lever three times and then press the button) so as to enhance security of the vehicle and/or flexibility to control the vehicle 101.

In some embodiments, when the mobile device 103 is within an inner boundary 111, (i.e. in Zone $Z_3$), a timer is activated. The timer is configured to provide user 10 a period of time (e.g., 5 minutes) to start the engine of the vehicle 101. If the user does not start the engine for the period of time, the system 100 can then lock the vehicle 101 (e.g., turn off the battery power). For example, in some embodiments, the button can be disabled (e.g., power off) such that the user 10 can no longer press the button to start the engine. This can save vehicle battery power and enhance vehicle security.

In some embodiments, if the system 100 determines that the mobile device 103 remains in Zone $Z_3$, it can periodically (e.g., every 35 seconds) check with the user 10 by sending notification to see if the user 10 still wants to keep the "Proximity-Auto-On" function activated. If so, the system 100 can unlock the vehicle 101 as described above. If not (e.g., no further operations from the user 10 via an app installed on the mobile device 103 or I/O components on the vehicle), the system 100 can deactivate the "Proximity-Auto-On" function. In some embodiments, the present system 100 allows the user 10 to set up the timing and location regarding when to activate the "Proximity-Auto-On" function. Table 1 below summaries the statuses and actions in different zones discussed in FIGS. 1A and 1B during the unlocking process in accordance with embodiments of the present disclosure.

TABLE 1

Unlocking process

| | Zone $Z_0$ (or $Z_4$) | Zone $Z_1$ (or $Z_4$) | Zone $Z_2$ (or $Z_4$) | Zone $Z_3$ |
|---|---|---|---|---|
| Mobile device | Disconnected to vehicle | Connected to vehicle | Connected to vehicle | Connected to vehicle |
| Power status of Vehicle | Locked (battery power off) | Locked (battery power off) | Locked (battery power off) | Unlockable by user action (battery power on) |
| "Proximity-Auto-On" | Not activated | Not activated | Not activated | Activated |
| Timer | Not activated | Not activated | Not activated | Activated |

FIG. 1C illustrates a locking process in accordance with embodiments of the present technology. In FIG. 1C, Zones $Z_2$ and $Z_3$ in FIG. 1A can be combined and together named as Zone $Z_5$, and Zones $Z_0$ and $Z_1$ in FIG. 1A can be combined and together named as Zone $Z_6$. As shown in FIG. 1C, when a user 12 stops a vehicle and turns off the motor of the vehicle, the auto-locking process is activated. The processor 1013 then activates a "Proximity-Auto-Off" function and instructs the distance measurement device 1011 to monitor the location of the mobile device 105. In some embodiments, when the processor 1013 detects that the mobile device 105 carried by the user 12 moves away from Zone $Z_5$ to Zone $Z_6$ (i.e., across the outer boundary 109 and away from the vehicle 101), the processor 1013 can perform the "Proximity-Auto-Off" function to turn off the battery power of the vehicle 101.

In some embodiments, if the user 12 wants to turn on the battery power of the vehicle 101, the user 12 can still do so by sending instructions to the vehicle 101 by the mobile device 105 (e.g., pressing a "lock" button shown in a user interface of the app installed on the mobile device 105). In the illustrated embodiments, the vehicle 101 remains unlocked. When the vehicle 101 is locked, the user 12 cannot fully control the vehicle 101, e.g., directly turning on the engine, by the mobile device 105 or I/O components on the vehicle 101. When the vehicle 101 is unlocked, the user 12 is able to fully control the vehicle 101 by the mobile device 105, including turning on the engine (e.g., by pressing a "GO" button, as discussed above with reference to FIG. 1B). In some embodiments, however, the vehicle 101 can be locked by the "Proximity-Auto-Off" function when the distance measurement device 1011 or the processor 1013 detects that the mobile device 105 carried by the user 12 moves away from Zone $Z_5$ to Zone $Z_6$ (i.e., across the outer boundary 109).

In some embodiments, when the processor 1013 detects that the mobile device 105 carried by the user 12 moves away from Zone $Z_5$ to Zone $Z_6$, the processor 1013 can perform the "Proximity-Auto-Off" function to turn off the battery power of the vehicle 101 and lock vehicle 101.

In some embodiments, referring back to FIG. 1A, when the processor 1013 detects that the mobile device 105 moves from Zone $Z_2$ to Zone $Z_1$, if the battery power is still on, the processor 1013 of the vehicle 101 will turn off the battery power and locks the vehicle 101. The system 100 will also deactivate the "Proximity-Auto-Off" function.

In some embodiments, the system 100 can provide a time buffer (e.g., 1-5 seconds; counted by a timer of the processor 1013 or the vehicle 101) before it turns off the battery power of the vehicle 101. The time buffer can be set by a user (e.g., user 10 or 12). In some embodiments, the timer can be used to track how long the mobile device 105 has been stayed in Zone $Z_2$ or Zone $Z_3$ so as to determine whether the user moves away from the vehicle 101 (in that case, the vehicle 101 can be locked for security purposes) or the user simply moves around in Zone $Z_2$ or Zone $Z_3$ without intention to leave the vehicle 101 (in that case, the vehicle 101 remain unlocked). Table 2 below summaries the statuses and actions in different zones discussed in FIGS. 1A and 1C during the locking process in accordance with embodiments of the present disclosure.

TABLE 2

| | Locking Process | | | |
|---|---|---|---|---|
| | Zone $Z_0$ (or $Z_6$) | Zone $Z_1$ (or $Z_6$) | Zone $Z_2$ (or $Z_5$) | Zone $Z_3$ (or $Z_5$) |
| Mobile device | Disconnected to vehicle | Connected to vehicle | Connected to vehicle | Connected to vehicle |
| Power status of Vehicle | Locked (battery power off) | Locked (battery power off) | Unlocked (battery power off; lockable by user action) | Vehicle stops; Engine off; unlocked (battery power on) |
| "Proximity-Auto-Off" | Not activated | Not activated | Activated | Activated |
| Timer | Not activated | Not activated | Activated | Activated |

In some embodiments, the system 100 enables a user to configure various "responses" from the vehicle 101 in various zones. For example, there can be more zones (e.g., more than 4 zones) than described in the embodiments above. For example, in some embodiments, a user can have five zones (e.g., Zone $A_0$-$A_4$, in the direction toward the vehicle 101). For example, in Zone $A_0$, the system 100 can start to establish a connection with a mobile device. In Zone $A_1$, the system 100 can periodically monitoring the location of the mobile device. In Zone $A_2$, the system 100 can keep monitoring the location of the mobile device (e.g., more frequently than it does in Zone $A_1$). When the system 100 detects that the mobile device enters Zone $A_3$ from Zone $A_2$, the system 100 can instruct the vehicle 101 to send a sound notification (e.g., play a sound, a song, or a melody) toward the mobile device. When the system 100 detects that the mobile device enters Zone $A_4$ from Zone $A_3$, the system 100 can activate the "Proximity-Auto-On" function and turn on the power of the vehicle 101 as described above.

In some embodiments, the sound notification can vary based on dates. For example, the sound notification can be a birthday song on the user's birthday. As another example, the sound notification can be a holiday greeting song on a holiday (e.g., New Year, Christmas, etc.). In some embodiments, when system 100 activates the "Proximity-Auto-On" function, it can also play a set of sounds or a song from a speaker of the vehicle 101. In some embodiments, the system 100 can keep playing a song when the "Proximity-Auto-On" function is activated (e.g., a 5-min-long song). In such embodiments, the user 10 or 12 can be notified and accordingly take an action (e.g., press a "GO" button to turn on the power of the vehicle 101, or press a "GO" button and holding a brake lever at the same time to start an engine/motor of the vehicle 101).

In some embodiments, these "response" from the vehicle 101 can include a movement of the vehicle 101. For example, the vehicle 101 (e.g., a self-balanced, four-wheeled vehicle, or a three-wheeled vehicle with a tilt mechanism locked during power off stage) can be parked in a narrow parking space in Zone $A_4$. When the mobile device (e.g., the mobile device 103 or 105) enters Zone $A_4$ (e.g., where the vehicle 101 is located) from Zone $A_3$, the vehicle 101 can move a bit toward the mobile device from the narrow parking space, such that the user 10 or 12 can easily access the vehicle 101. In some embodiments, the number of zones can be adjusted based on user preferences, actual needs, and/or the number of events/responses during locking/unlocking processes. In some embodiments, the responses can include (i) providing power to an indicative light of the vehicle 101, (ii) playing a sound from a speaker of the vehicle 101, and/or (iii) providing power to an engine of the vehicle to cause a movement of the vehicle 101.

Figure 2A:
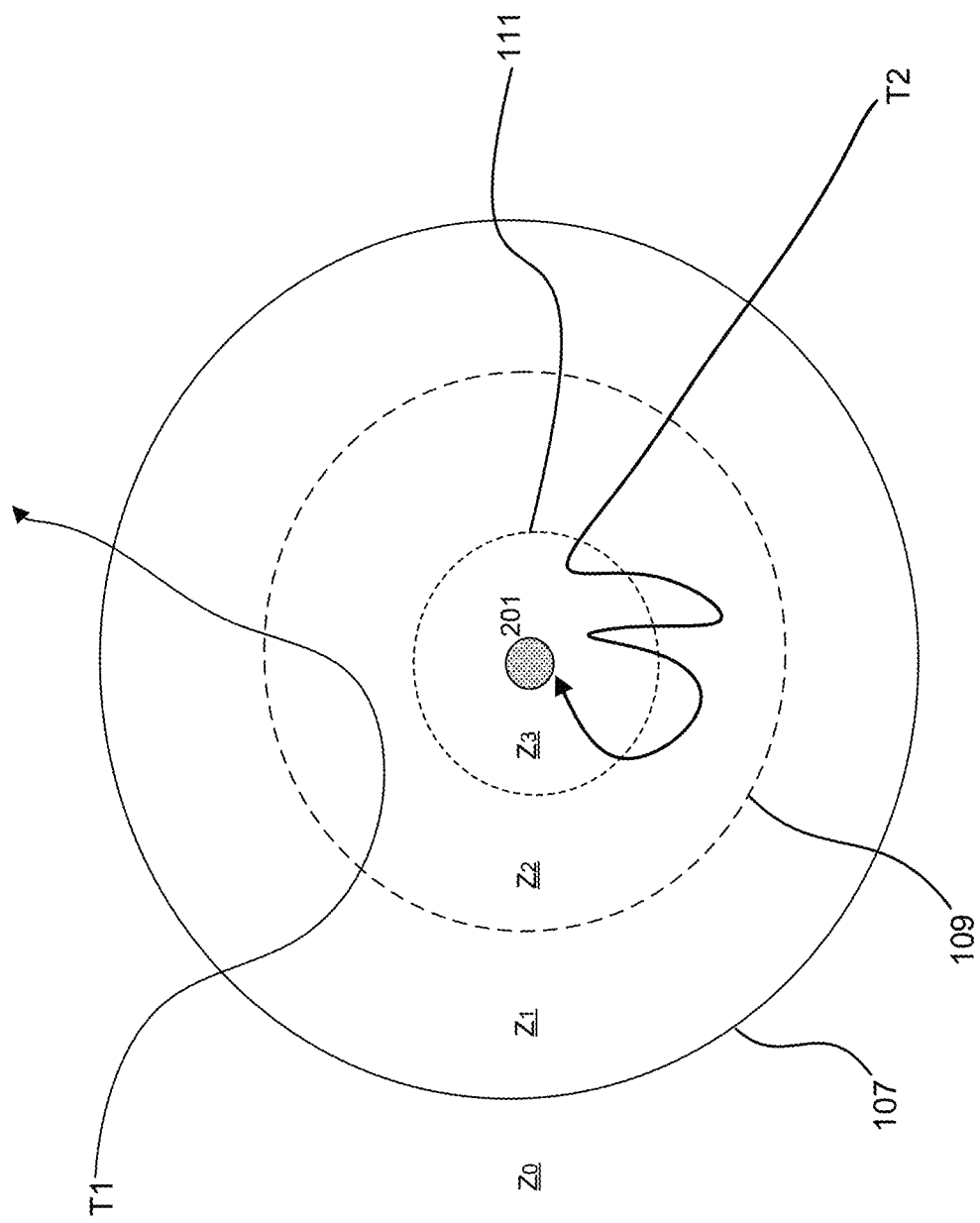
FIG. 2A is a schematic diagram (top view) illustrating multiple trajectories of a movable object associated with a vehicle in accordance with embodiments of the disclosed technology.

FIG. 2A is a schematic diagram (top view) illustrating multiple trajectories $T_1$, $T_2$ of a movable object (e.g., mobile device 103 or 105 discussed above) associated with a vehicle 201 in accordance with embodiments of the disclosed technology. The present system can lock (e.g., turn off battery power) or unlock (e.g., turn on battery power) the vehicle 201 based on predetermined trajectories of the movable object. For example, trajectory $T_1$ indicates that the moving object moved toward the vehicle 201 from Zone $Z_0$ to Zone $Z_2$, without further entering Zone $Z_3$. By default, the system will activate the "Proximity-Auto-On" function when the movable object enters Zone $Z_2$ or continuously monitor whether the movable object enters Zone $Z_3$ or not so as to activate the "Proximity-Auto-On" function (based on a setting regarding in which zone to activate the "Proximity-Auto-On" function). However, if the system determines that there were many occasions that the moveable object travelled along trajectory $T_1$ but a user did not eventually turn on an engine/motor of the vehicle 201, the system can accordingly adjust its Zone $Z_2$ by moving the outer boundary 109 toward the vehicle 201 (such that a movement along trajectory $T_1$ will not trigger the "Proximity-Auto-On" function).

As another example, trajectory $T_2$ indicates that the moving object moved toward the vehicle 201 from Zone $Z_0$ to Zone $Z_3$, returned to Zone $Z_2$, and re-entered Zone $Z_3$ several times. By default, the system will activate the "Proximity-Auto-On" function when the movable object enters Zone $Z_2$, and then turns on the battery power of the vehicle 201 once the moveable objects enters Zone $Z_3$. However, if the system determines that there were many occasions that the moveable objects travelled along trajectories $T_1$ but the user did not eventually turn on the engine/motor of the vehicle 201, the system can accordingly adjust its Zone $Z_3$ by moving the inner boundary 111 further toward the vehicle 201 (such that the system will only turn on the battery power of the vehicle 201 when the moveable object is very close to the vehicle 201. For example, in some embodiments, the size/shape of the inner boundary 111 can be dynamically adjusted.

Figure 2B:
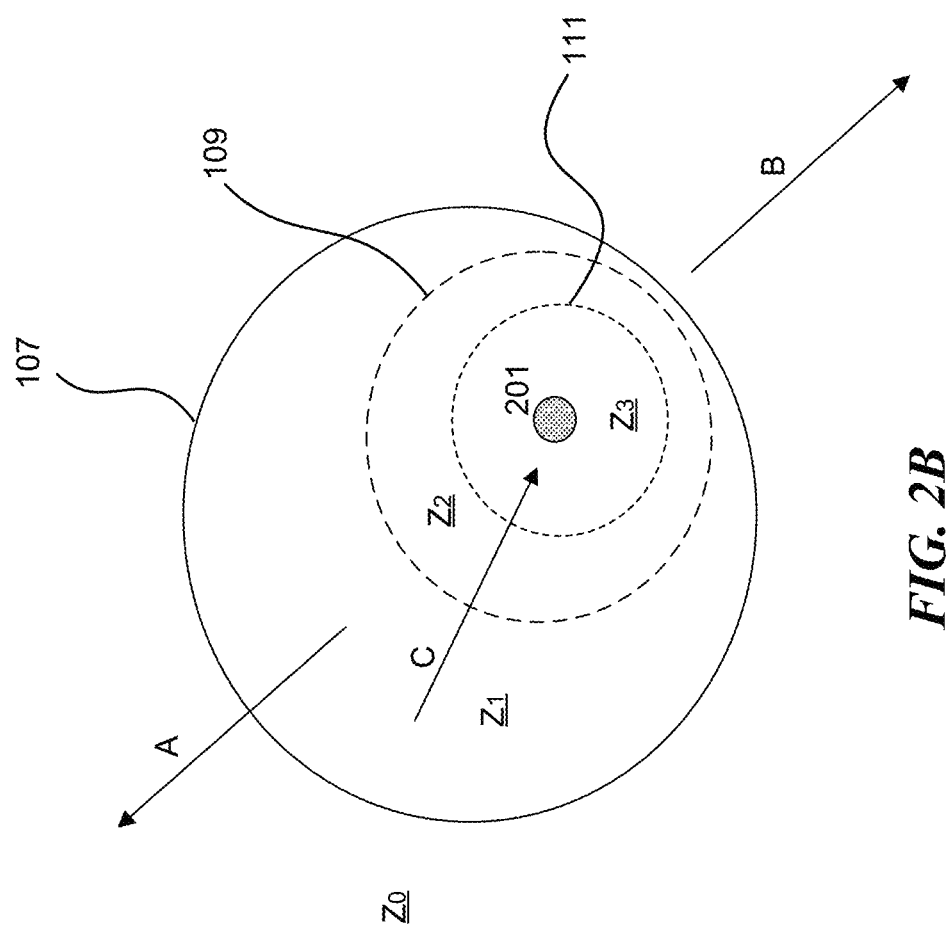
FIG. 2B is a schematic diagram (top view) illustrating multiple non-concentric zones associated with a vehicle in accordance with embodiments of the disclosed technology.

FIG. 2B is a schematic diagram (top view) illustrating multiple non-concentric zones (Zones $Z_{0-3}$) associated with the vehicle 201 in accordance with embodiments of the disclosed technology. In the illustrated embodiments, the zones can be determined by a user and do not need to be concentric. In the illustrated embodiments, these non-concentric zones can be configured to accommodate various factors, such as quality difference of signals from various directions (e.g., the vehicle 201 can receive signals with better quality in direction A than direction B). In some embodiments, the zones can be determined based on user behavior. For example, a user often approaches the vehicle 201 in direction C.

Figure 2C:
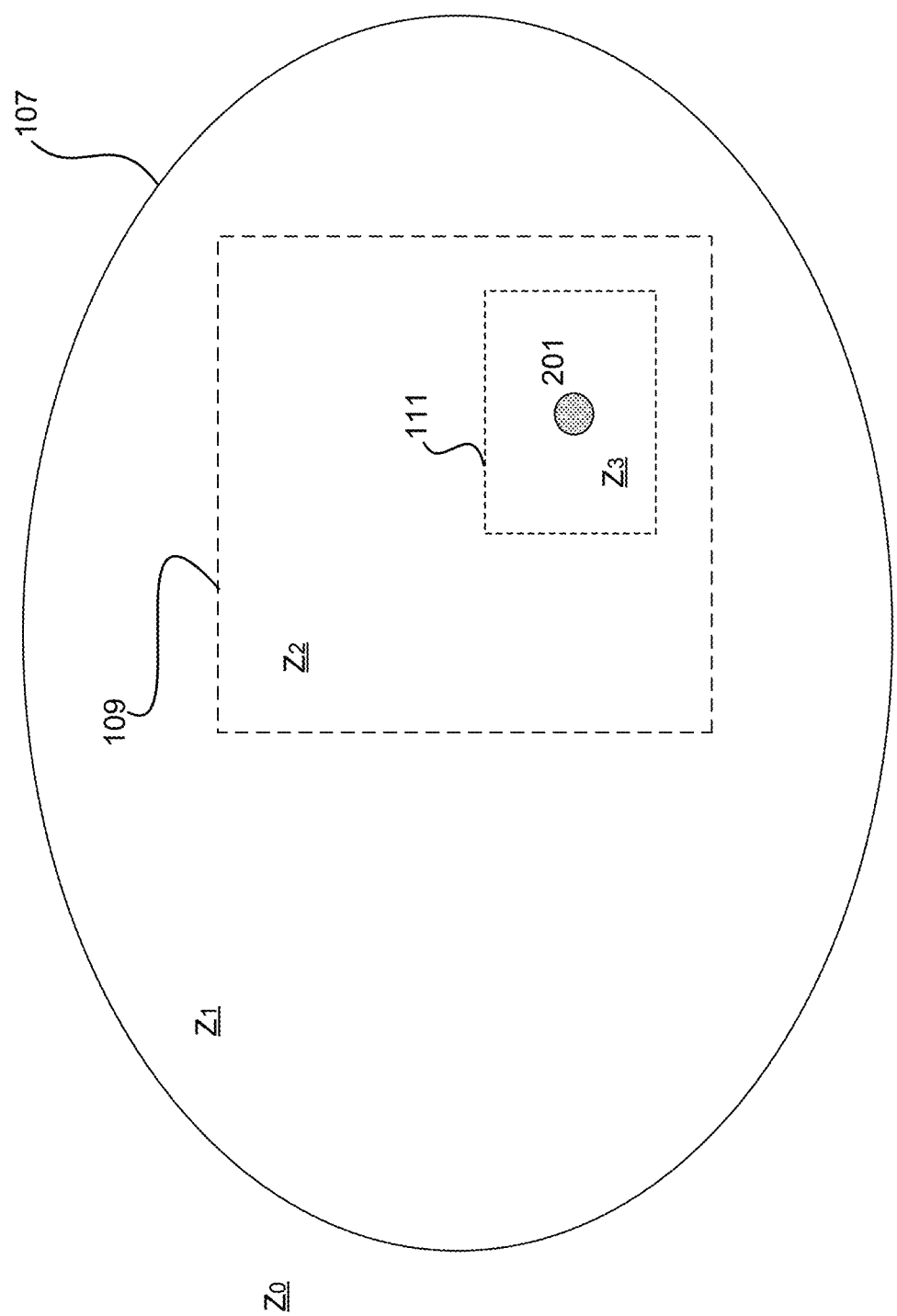
FIG. 2C is a schematic diagram (top view) illustrating multiple zones with various shapes associated with a vehicle in accordance with embodiments of the disclosed technology.

FIG. 2C is a schematic diagram (top view) illustrating multiple zones (Zones $Z_{0-3}$) with various shapes associated with the vehicle 201 in accordance with embodiments of the disclosed technology. In the illustrated embodiments, for example, Zone $Z_3$ can be a rectangular (e.g., a shape of a parking space), Zone $Z_2$ can be a square (e.g., a shape of a building), and Zone $Z_1$ can be an ellipse (e.g., a shape of a company campus or a residential area). In some embodiments, the shapes and sizes of these zones can be adjusted based on user preferences, user behavior, environmental factors, etc. In some embodiments, a user may adjust the size of the inner boundary and outer boundary via an app installed on the mobile device, for example, based on the user's personal preference. In some embodiments, the shapes of zones can be determined by a geo-fence or the like.

FIG. 3A is a schematic diagram illustrating various states of a vehicle during an auto-unlocking process in accordance with embodiments of the disclosed technology. At block 301, the vehicle is in a "locked" state, where its battery power and engine/motor are both turned off. When the vehicle is moved to a "Proximity-Auto-On" state, at block 303, the vehicle's battery power and engine/motor remain turned off, but a "Proximity-Auto-On" function is activated to monitor the location of a mobile device associated with the vehicle, such that the system can determine whether to turn on the battery power of the vehicle (e.g., "unlock" the vehicle). In some embodiments, at the "Proximity-Auto-On" state (block 303), there is only limited function accessible to a user of the vehicle. For example, only some of the I/O components are enabled/turned on, so that the user can only (1) unlock the vehicle by pressing a start button (e.g., a "GO" button) or (2) open a trunk of the vehicle by pressing another function key or button. At block 305, the vehicle is moved to an "unlocked" state, where its battery power is turned on but its engine is still turned off. The vehicle can be "unlocked" (e.g., from block 303 to block 305) by the "Proximity-Auto-On" function, in response to a detection of a movement or location change of the mobile device associated with the vehicle and/or by receiving an unlock signal sent from authenticated mobile device or key fob. When the user starts the engine, the vehicle state moves from "unlocked" at block 305 to "ready-to-operate" at block 307.

FIG. 3B is a schematic diagram illustrating various states of a vehicle during an auto-locking process in accordance with embodiments of the disclosed technology. At block 309, a user stops the vehicle, but its engine/motor remains on. After the user turns off the engine/motor, the state of the vehicle moves to "unlocked" at block 305. When the vehicle state is moved to "unlocked" from block 309, the system activates a "Proximity-Auto-Off" function to monitor the location of a mobile device associated with the vehicle, so as to determine when to turn off battery power of the vehicle (e.g., lock the vehicle). The vehicle can be "locked" (e.g., from block 305 to block 301) by the "Proximity-Auto-Off" function, in response to a detection of a movement or location change of the mobile device associated with the vehicle, showing that the user moves away from the vehicle. When the vehicle is "locked" at block 301, its battery power and engine are both turned off. In some embodiments, when the user turns off the engine, the system can skip the unlocked state (block 305), and directly set the vehicle state from the "engine on" state (corresponding to block 309) to the "locked" state (block 301).

Figure 4:
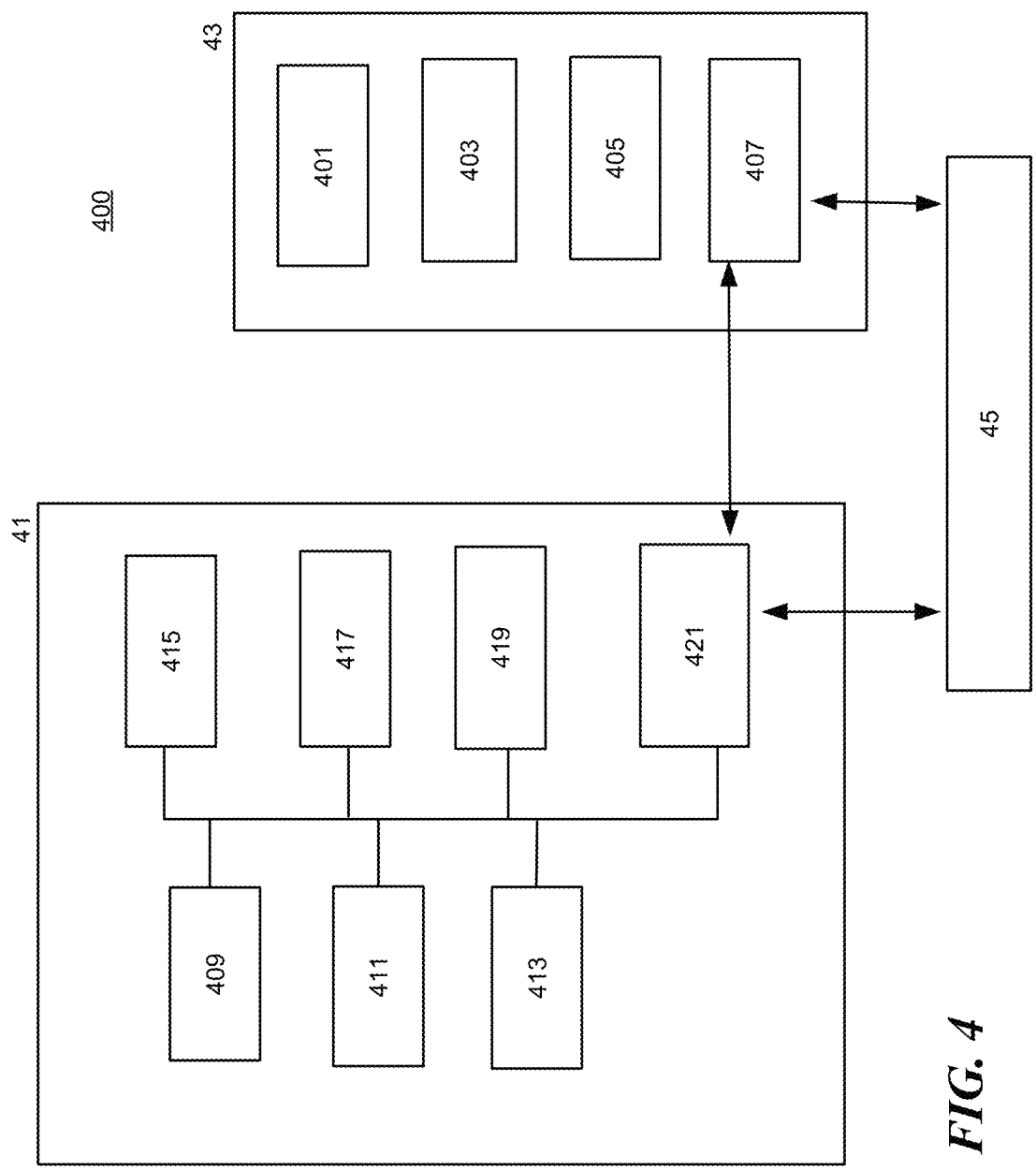
FIG. 4 is a schematic diagram illustrating a system in accordance with embodiments of the disclosed technology.

FIG. 4 is a schematic diagram illustrating a system 400 in accordance with embodiments of the disclosed technology which can be referred to the system 100 in FIG. 1A. As shown, the system 400 includes and an electric vehicle 41 and a mobile device 43. In some embodiments, the mobile device 43 can include a smartphone, a tablet, a smart watch, a notebook, other type of computing device, etc. In some embodiments, the mobile device 43 can also be a wireless key fob with actively wireless signal transmission ability or the like. In some embodiments, the electric vehicle 41 can be an electric scooter or other vehicles with security mechanisms. In some embodiments, the electric vehicle 41 can communicate with the mobile device 43 via a direct wireless connection or a wireless network (e.g., Bluetooth, infrared, Wi-Fi, 3G/4G/5G, etc.). The mobile device 43 and/or the electric vehicle 41 can further communicate with a server 45 (e.g., update its location). In some embodiments, the wireless communication network between the mobile device 43 and the server 45 can be different from the wireless communication network or the direct wireless connection between the electric vehicle 41 and the server 45.

In some embodiments, the mobile device 43 is configured with an application (e.g., an app) that instructs the processor of the mobile device to communicate with a processor 409 of the electric vehicle 41 through a wireless communication link. In some embodiments, the app uses a Bluetooth wireless communication protocol to communicate with a paired receiver in the electric vehicle 41. The Bluetooth protocol establishes a communication link whenever the paired deices are in range. The receiver in the electric vehicle 41 can therefore use a received signal strength of the Bluetooth signal as an indicator of how close the mobile device is to the vehicle (e.g., the RSSI). Once the mobile device is within a desired range, a user can activate the electric vehicle 41 (pressing a "GO" command on a dashboard) without requiring any additional key entries from the user.

Similarly, to lock the electric vehicle 41, the received signal strength of the Bluetooth communication signals indicates when the user has walked away from the electric vehicle 41 and can turn the vehicle off if the signal strength drops below a predetermined minimum strength.

In some embodiments, the processor 409 in the electric vehicle 41 can send periodic beacons that are coded to match a code of the mobile device 43. Upon receipt of the beacon, a processor 401 of the mobile device 43 sends a signal back to the electric vehicle 41 with an indication of its position (e.g., GPS coordinates). In some embodiments, the signals between the electric vehicle 41 and the mobile device 43 are encrypted or encoded so that only the correct paired mobile device 43 is able to activate or turn off the electric vehicle 41. In some instances, the processor 401 of the mobile device 43 uses an unlocking mechanism of the mobile device 43 (e.g., code, thumbprint, facial recognition, etc.) to generate a signal to the electric vehicle 41 that allows the electric vehicle 41 to be unlocked). For example, the processor 401 of the mobile device 43 may prompt the user for their thumb print and upon successful presentation of the thumb print, send a message to the electric vehicle 41 confirming that the electric vehicle 41 can be started.

In another embodiment, the mobile device 43 is programmed by the app to send periodic beacon signals that are encoded for the electric vehicle 41. Upon receipt of a beacon signal, the mobile device 43 and the vehicle begin transmitting signals via a wireless link indicating the position of the mobile device 43 so that the processor 409 in the electric vehicle 41 can implement the lock/unlock procedures described.

As shown in FIG. 4, the electric vehicle 41 includes the processor 409, a memory 411, a battery 413, a motor 415, an input device 417, a dashboard display 419, and a communication component 421. The processor 409 is configured to interact with the memory 411 and other components (e.g., components 413-421) in the electric vehicle 41. The memory 411 is coupled to the processor 409 and configured to store instructions for controlling other components or other information in the electric vehicle 41. The battery 413 can be the main battery mentioned above and is configured to power the motor 415 such that the motor 415 can move the electric vehicle 41. The dashboard display 419 is configured to visually present information to a user. The communication component 421 is configured to communicate with other systems (e.g., the mobile device 43 or the server 45).

As shown in FIG. 4, the mobile device 43 includes the processor 401, a location management component 403, a storage component 405, and a communication component 407. The processor 401 is configured to control other components of the mobile device 43 and to execute instructions to perform desired operations.

The location management component 403 is configured to track locations of the mobile device 43 (e.g., including trajectories showing locations in the past). In some embodiments, the locations of the mobile device 43 can be measured by a GPS sensor (not shown). In some embodiments, the location information can include data measured by a gyro sensor or an accelerometer. The location information can be stored in the storage component 405 or uploaded to the server 45. The location management component 403 is configured to provide the tracked location information of the mobile device 43.

In the illustrated embodiments, the location measurement component 417 is configured to measure the location of the mobile device 43 based on a wireless signal strength (e.g., Bluetooth signal strength) or other signal characteristics. The measured locations of the mobile device 43 can be analyzed to determine the current location of the mobile device 43, such that to determine whether to activate a "Proximity-Auto-On" function discussed above. The measured locations are also used to determine whether to lock or unlock the electric vehicle 41 by turning off or turning on power supplied by the battery 413. In some embodiments, the mobile device 43 can be implemented as a controller or a system-on-chip (SOC) system that can perform the functions described above. In some embodiments, the location measurement component 417 can use two or more information sources to verify the location of the mobile device 43. For example, the location measurement component 417 can use Bluetooth signal strength as well as signals or information regarding movements of the mobile device (e.g., signals or information generated by an accelerator or a gyroscope in the mobile device 43).

In some embodiments, the electric vehicle 41 can include (i) a wireless module (e.g., the communication component 421) configured to establish a wireless connection with the mobile device 43 to receive wireless signals from the mobile device 43; (ii) a processor (e.g., the processor 401) configured to analyze at least one characteristic of the wireless connection to determine a current location of the mobile device 43; and (iii) a first input/output (I/O) component (e.g., the input device 417 or the dashboard display 419) configured to generate a first signal in response to a user action. The processor can be further configured to unlock the electric vehicle 41 in response to a determination, based on the current location, that the mobile device 43 is within an inner boundary (e.g., the inner boundary 111) adjacent to the electric vehicle 41, and that the first signal is received. The processor 401 can be further configured to lock the electric vehicle 41 in response to a determination, based on the current location, that the mobile device 43 is external to an outer boundary (e.g., the outer boundary 109) external to the inner boundary.

Figure 5:
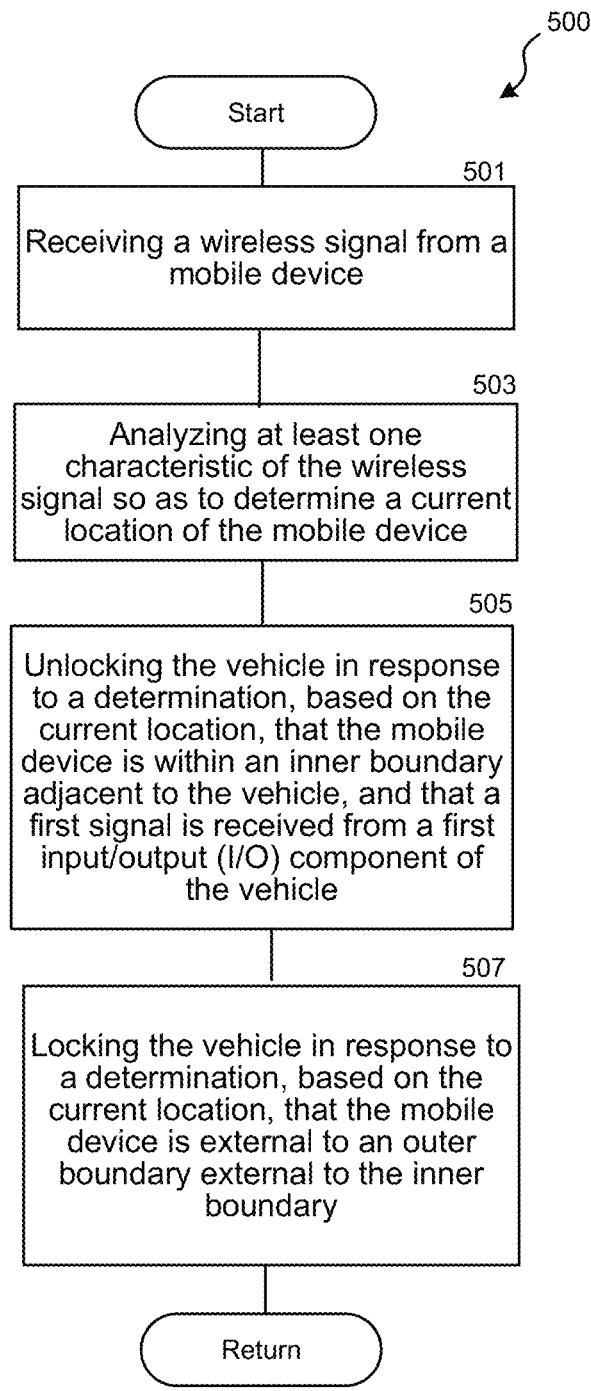
FIG. 5 is a flowchart illustrating a method in accordance with embodiments of the disclosed technology.
Figure 6:
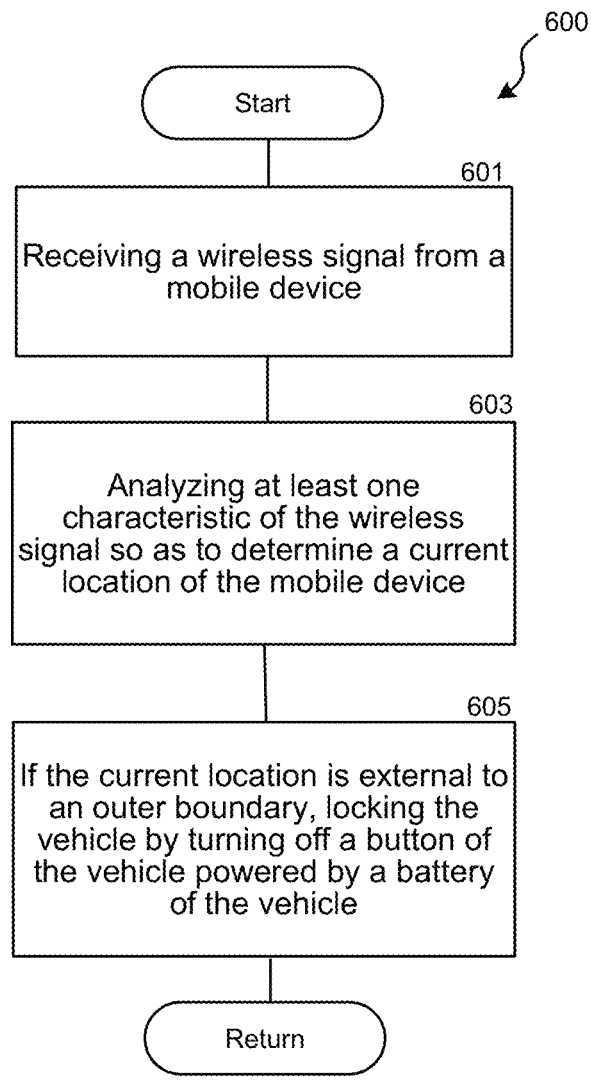
FIG. 6 is a flowchart illustrating a method in accordance with embodiments of the disclosed technology.
Figure 7:
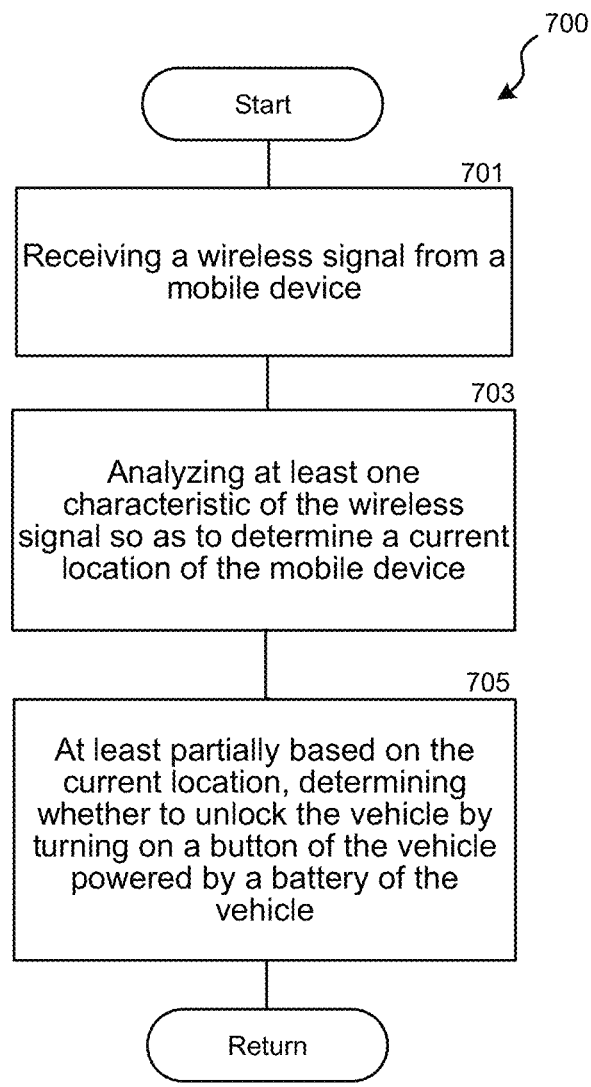
FIG. 7 is a flowchart illustrating a method in accordance with embodiments of the disclosed technology.

FIGS. 5-7 are flowcharts illustrating methods 500, 600 and 700 in accordance with embodiments of the disclosed technology. The method 500 can be used to control (e.g., unlock or lock) a vehicle by turning on or turning off battery power of the vehicle. The method 500 can be implemented by a vehicle and a mobile device. In some embodiments, the mobile device can be implemented as a controller, a stand-alone chip set or circuitry, or other types of suitable devices. The method 500 starts at block 501 by receiving a wireless signal (e.g., a Bluetooth signal) from a mobile device. At block 503, the method 500 continues by analyzing at least one characteristic (e.g., signal strength) of the wireless signal so as to determine a current location of the mobile device (e.g., a distance between the vehicle and the mobile device).

At block 505, the method 500 then proceeds to unlock the vehicle in response to a determination, based on the current location, that the mobile device is within an inner boundary adjacent to the vehicle (or a determination that the mobile device moves across the inner boundary), and that a first signal is received from a first input/output (I/O) component of the vehicle. In some embodiments, alternatively, the method 500 can, in response to a determination that the current location is in a first predetermined zone (e.g., Zone $Z_3$ discussed above with reference to FIGS. 1A-2C) adjacent to the vehicle, enable an engine/motor of the vehicle to be turned on by receiving instructions through a component (e.g., a display or a button) of the vehicle powered by a battery of the vehicle.

At block 507, the method 500 continues by, locking the vehicle in response to a determination, based on the current location, that the mobile device is external to an outer boundary external to the inner boundary (or a determination that the mobile device moves across the outer boundary). In some embodiments, alternatively, the method 500 can include, in response to a determination that the current location is in a second predetermined zone (e.g., Zone $Z_2$ discussed above with reference to FIGS. 1A-2C) next to the first predetermined zone, enabling the engine of the vehicle to be turned off. In some embodiments, the engine of the vehicle can be turned off automatically in response to the determination that the current location is in the second predetermined zone (if the engine has not been turned off by a user). In some embodiments, when determining that the current location of the mobile device is in the second predetermined zone, after the engine has been turned off, the method can enable the engine to be further turned on by receiving instructions through the component (e.g., a display or a button) of the vehicle powered by the battery. It is noted that the unlocking process at block 505 and the locking process at block 507 can be implemented separately based on actual use (e.g., only the unlocking process at block 505 is implemented without the implementation of block 507, or vice versa).

The method 600 is directed to lock a vehicle (e.g., turn its battery power or other power source off) based on a location or moving trajectory of a mobile device associated with the vehicle. The method 600 includes, at block 601, (1) receiving a wireless signal from a mobile device; (2) analyzing at least one characteristic of the wireless signal so as to determine a current location of the mobile device (block 603); and (3) if the current location is external to an outer boundary, locking the vehicle, for example, by turning off the power supply from the battery and/or turning off a button of the vehicle powered by a battery of the vehicle (block 605). In some embodiments, turning off the button of the vehicle disables an engine of the vehicle to be turned on by receiving instructions through the button.

The method 700 is directed to unlock a vehicle (e.g., turn its battery power on) based on a location or moving trajectory of a mobile device associated with the vehicle. The method 700 includes, at block 701, (1) receiving a wireless signal from a mobile device; (2) analyzing at least one characteristic of the wireless signal so as to determine a current location of the mobile device (block 703); and (3) at least partially based on the current location, determining whether to unlock the vehicle by, for example, turning on a button of the vehicle powered by a battery of the vehicle (block 705). In some embodiments, turning on the button of the vehicle enables an engine of the vehicle to be turned on by receiving instructions through the button.

Although the present technology has been described with reference to specific exemplary embodiments, it will be recognized that the present technology is not limited to the embodiments described but can be practiced with modification and alteration within the spirit and scope of the appended claims. Accordingly, the specification and drawings are to be regarded in an illustrative sense rather than a restrictive sense.

We claim:

1. A method for controlling a vehicle, comprising:
   receiving a wireless signal from a mobile device;
   analyzing at least one characteristic of the wireless signal to determine a current location of the mobile device;
   unlocking the vehicle in response to a determination, based on the current location, that the mobile device moves across an inner boundary toward the vehicle and that the mobile device is within the inner boundary adjacent to the vehicle, and that a first signal is received from a first input/output (I/O) component of the vehicle; and
   locking the vehicle in response to a determination, based on the current location, that the mobile device is external to an outer boundary external to the inner boundary,
   wherein the inner boundary is determined at least based on a quality difference of signals from at least two directions.

2. The method of claim 1, wherein the first I/O component comprises a physical button, a touch screen, or a brake lever.

3. The method of claim 1, further comprising determining the inner boundary and the outer boundary based on a user configuration.

4. The method of claim 1, wherein the at least one characteristic of the wireless signal includes a signal strength and a distance between the mobile device and the vehicle.

5. The method of claim 1, further comprising, in response to the determination that the mobile device moves across the inner boundary toward the vehicle, turning on a display of the vehicle powered by a battery of the vehicle.

6. The method of claim 1, further comprising, enabling an engine of the vehicle to be turned on by receiving the first signal from the first I/O component and receiving a second signal from a second I/O component of the vehicle prior to receiving the first signal, wherein the first I/O component is a physical button, and wherein the second I/O component is a brake lever, and wherein the first signal is generated responsive to an operation of pressing the physical button, and wherein the second signal is generated responsive to an operation of holding the brake lever.

7. The method of claim 1, further comprising, enabling the engine of the vehicle to be turned on in response to the determination, based on the current location, that the mobile device is within the inner boundary adjacent to the vehicle, that the first signal is received from the first I/O component of the vehicle, and that a second signal is received from a second I/O component of the vehicle at generally the same time, wherein the first I/O component is a physical button, and wherein the second I/O component is a brake lever, and wherein the first signal is generated responsive to an operation of pressing the physical button, and wherein the second signal is generated responsive to an operation of holding the brake lever.

8. The method of claim 1, further comprising:
   in response to the determination that the mobile device moves across the inner boundary toward the vehicle, opening a trunk lid of the vehicle.

9. The method of claim 1, wherein the wireless signal is from an active wireless communication component of the mobile device, and wherein the active wireless communication component is controlled by an application installed in the mobile device.

10. The method of claim 1, wherein in response to the determination that the mobile device moves across the inner boundary toward the vehicle or the determination that the mobile device is within the inner boundary adjacent to the vehicle, the method further comprises (i) providing power to an indicative light of the vehicle, (ii) playing a sound from a speaker of the vehicle, or (iii) providing power to an engine of the vehicle to cause a movement of the vehicle.

11. The method of claim 1, further comprising:
   initiating a timer in response to a determination that the mobile device moves across the inner boundary toward the vehicle or the determination that the mobile device is within the inner boundary adjacent to the vehicle; and
   locking the vehicle after a period of time measured by the timer.

12. The method of claim 1, further comprising:
   verifying the current location of the vehicle at least partially based on information measured by a sensor of the mobile device.

13. A method for unlocking a vehicle, comprising:
    receiving a wireless signal from a mobile device;
    analyzing at least one characteristic of the wireless signal to determine a current location of the mobile device; and
    at least partially based on the current location and a determination that the mobile device moves across an inner boundary toward the vehicle, determining whether to unlock the vehicle by turning on a button of the vehicle;
    wherein turning on the button of the vehicle enables an engine of the vehicle to be turned on by receiving instructions through the button,
    wherein the inner boundary is determined at least based on a quality difference of signals from at least two directions.

14. The method of claim 13, wherein the characteristic includes a signal strength.

15. The method of claim 13, further comprising:
    if the current location is within the inner boundary adjacent to the vehicle, opening a trunk lid of the vehicle.

16. The method of claim 13, further comprising, if the current location is within the inner boundary adjacent to the vehicle, enabling the engine of the vehicle to be turned on by pressing the button and holding a brake lever prior to pressing the button.

17. The method of claim 13, further comprising, further comprising, if the current location is within the inner boundary adjacent to the vehicle, enabling the engine of the vehicle to be turned on by holding a brake lever of the vehicle and pressing a button of the vehicle.

18. A method for locking a vehicle, comprising:
   establishing a wireless signal from a mobile device;
   analyzing at least one characteristic of the wireless signal to determine a current location of the mobile device; and
   if the current location is external to an outer boundary and it is determined that the mobile device moves across the outer boundary away from the vehicle, locking the vehicle by turning off power supply from a battery of the vehicle,
   wherein the outer boundary is determined at least based on a quality difference of signals from at least two directions.

19. The method of claim 18, further comprising determining to turn off the power supply of the vehicle in response to a determination that the mobile device has been moved away from the vehicle across the outer boundary.

20. The method of claim 19, wherein the determination that the mobile device has been moved away from the vehicle is at least partially based on analyzing a trajectory of the mobile device.

21. A vehicle, comprising:
   a wireless module configured to receive a wireless signal from a mobile device;
   a processor, coupled to the wireless module configured to analyze at least one characteristic of the wireless connection to determine a current location of the mobile device; and
   a first input/output (I/O) component, coupled to the processor, configured to generate a first signal in response to a user action;
   wherein the processor is further configured to unlock the vehicle in response to a determination, based on the current location, that the mobile device is within an inner boundary adjacent to the vehicle, that the mobile device moves across the inner boundary toward the vehicle, and that the first signal is received;
   wherein the processor is further configured to lock the vehicle in response to a determination, based on the current location, that the mobile device is external to an outer boundary external to the inner boundary; and
   wherein the inner boundary is determined at least based on a quality difference of signals from at least two directions.

22. The vehicle of claim 21, wherein the first I/O component comprises a physical button, a touch screen, or a brake lever.

23. The vehicle of claim 21, further comprising determining the inner boundary and the outer boundary based on a user configuration.

24. The vehicle of claim 21, wherein the at least one characteristic of the wireless connection includes a signal strength and a distance between the mobile device and the vehicle.

25. The vehicle of claim 21, wherein the processor is further configured to turn on a display of the vehicle, in response to a determination that the mobile device moves across the inner boundary toward the vehicle.

26. The vehicle of claim 21, wherein the processor is further configured to enable an engine of the vehicle to be turned on by receiving the first signal from the first I/O component and receiving a second signal from a second I/O component of the vehicle prior to receiving the first signal, and wherein the first I/O component is a physical button, and wherein the second I/O component is a brake lever, and wherein the first signal is generated responsive to an operation of pressing the physical button, and wherein the second signal is generated responsive to an operation of holding the brake lever.

27. The vehicle of claim 21, wherein the processor is further configured to enable an engine of the vehicle to be turned on in response to the determination, based on the current location, that the mobile device is within the inner boundary adjacent to the vehicle, that the first signal is received from the first I/O component of the vehicle, and that a second signal is received from a second I/O component of the vehicle at generally the same time, wherein the first I/O component is a physical button, and wherein the second I/O component is a brake lever, and wherein the first signal is generated responsive to an operation of pressing the physical button, and wherein the second signal is generated responsive to an operation of holding the brake lever.

28. The vehicle of claim 21, further comprising:
   in response to a determination that the mobile device moves across the inner boundary toward the vehicle, opening a trunk lid of the vehicle.

29. The vehicle of claim 21, wherein the wireless signal is received from an active wireless communication component of the mobile device, and wherein the active wireless communication component is controlled by an application installed in the mobile device.

30. The vehicle of claim 21, wherein the processor is further configured to (i) instruct a battery of the vehicle to provide power to an indicative light of the vehicle, (ii) instruct a speaker of the vehicle to play a sound, or (iii) instruct the battery of the vehicle to provide power to an engine of the vehicle, in response to a determination that the mobile device moves across the inner boundary toward the vehicle or the determination that the mobile device is within the inner boundary adjacent to the vehicle.

31. The vehicle of claim 21, wherein the processor further enables a timer configured to be initiated in response to the determination that the mobile device moves across the inner boundary toward the vehicle or the determination that the mobile device is within the inner boundary adjacent to the vehicle;
   wherein the processor locks the vehicle after a period of time measured by the timer.

32. The vehicle of claim 21, wherein the processor further configure to verify the current location of the vehicle at least partially based on information measured by a sensor of the mobile device.

* * * * *